(12) United States Patent
Leung et al.

(10) Patent No.: US 7,974,970 B2
(45) Date of Patent: Jul. 5, 2011

(54) DETECTION OF UNDESIRABLE WEB PAGES

(75) Inventors: Gilbert Leung, Mountain View, CA (US); Lei Duan, San Jose, CA (US); Dmitri Pavlovski, San Francisco, CA (US); Su Han Chan, Sunnyvale, CA (US); Kostas Tsioutsiouliklis, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 447 days.

(21) Appl. No.: 12/248,267

(22) Filed: Oct. 9, 2008

(65) Prior Publication Data
US 2010/0094868 A1 Apr. 15, 2010

(51) Int. Cl.
*G06F 17/30* (2006.01)
(52) U.S. Cl. .................. 707/713; 707/715; 707/726
(58) Field of Classification Search .................. 707/688, 707/696, 713, 715, 726
See application file for complete search history.

(56) References Cited

U.S. PATENT DOCUMENTS

| | | | |
|---|---|---|---|
| 7,451,391 B1 * | 11/2008 | Coleman et al. | 715/234 |
| 7,509,344 B1 * | 3/2009 | Kamvar et al. | 1/1 |
| 2006/0069667 A1 * | 3/2006 | Manasse et al. | 707/2 |
| 2006/0095416 A1 * | 5/2006 | Barkhin et al. | 707/3 |
| 2006/0174198 A1 * | 8/2006 | Brown et al. | 715/530 |
| 2006/0184500 A1 * | 8/2006 | Najork et al. | 707/1 |
| 2007/0260601 A1 * | 11/2007 | Thompson et al. | 707/5 |
| 2009/0089244 A1 * | 4/2009 | Donato et al. | 707/3 |
| 2009/0198673 A1 * | 8/2009 | Gao et al. | 707/5 |
| 2009/0222435 A1 * | 9/2009 | Andersen et al. | 707/5 |
| 2009/0249482 A1 * | 10/2009 | Sarathy | 726/22 |

OTHER PUBLICATIONS

Du et al., "Web Filtering Using Text Classification", University of Wollongong, Australia, 2003. pp. 325-330.*
Information Theory, Wikipedia entry printed from www.wikipedia.com on Jan. 11, 2011, 12 pages.

* cited by examiner

*Primary Examiner* — Hanh B Thai
(74) *Attorney, Agent, or Firm* — Brinks Hofer Gilson & Lione

(57) ABSTRACT

A system for detecting artificial promotion of a resource, including a search engine operative to index a set incoming links ("inlinks") which reference the resource, a log module coupled with the search engine and configured to store log data associated with the set of inlinks, a partitioning module coupled with log module and operative to partition the set of inlinks into a plurality of groups of inlinks based on at least one partitioning scheme, a statistics module coupled with the partitioning module and operative to compute a statistic associated with the inlinks within each of the plurality of groups of inlinks, and a computation module coupled with the statistics module and operative to process the computed statistic associated with the inlinks of each of the plurality of groups of inlinks and compute a metric associated with set of inlinks where the metric indicates a level of uniformity of a distribution of values of the respective computed statistics among the plurality of groups of inlinks, and where the search engine places a list of search results, generated in response to a search query, in a pattern based on the metric.

22 Claims, 4 Drawing Sheets

DETECTION OF UNDESIRABLE WEB PAGES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users of network-connected computers and mobile devices, such as personal digital assistants, may request information by formulating a search query and submitting the search query, for example, to an Internet search engine. Internet search engines are often used to search (i.e. query) the Internet for specific content that is of interest to the user. Queries are commonly accomplished by entering keywords into a search field, provided by the Internet search engine, that relate to the specific interest of the user. In response to the submission of a query (i.e., performing a "search"), Internet search engines provide a list of search results, also referred to as "hits", that typically contain hyperlinks (or simply links) referencing the desired web pages. Upon clicking on such links in a web browser, a user can navigate to the "landing" or destination pages pertaining to the issued query.

With the growth of the Internet and the World Wide Web, the corpus of searchable resources indexed (i.e., extracted) by Internet search engines has increased dramatically. As such, a given query may return a overwhelmingly long list of search results. In such instances, the Internet search engine may further order the search results based on a determined relevancy of each of the search results. For example, one common approach positions, or displays, the most relevant search results near the top of the search results page (SRP) for facilitating selection by a user. Accordingly, users tend to focus on these top results, often to the exclusion of results presented further down the page, thereby resulting in increased traffic to the top results.

Commercial web sites typically receive revenue from advertisers based on page views. Therefore there exists an incentive to increase web traffic to the commercial web sites in order to increase advertising revenue for the web site operators. As a result, search engine optimizers (SEOs), services which are paid to increase the prominence/position of a subscriber's web page within search results for purpose of increasing traffic and thereby, revenue, often attempt to manipulate the ranking of the subscribers' web pages by artificial techniques which take advantage of certain known features used by search engines. One technique utilized by SEOs to promote target web pages involves creating a surplus of inlinks (incoming links) that "point" to (i.e., reference) the destination page, based on the assumption that the web pages that are referenced more frequently are typically considered by Internet search engines as being of higher quality. In addition, the perceived relevancy of such web pages are also enhanced by inundating the "anchor texts" (i.e., words appearing within clickable links on web pages) associated with the hyperlink references with frequent keywords that web users issue in their search queries.

Artificially promoted web pages are often of low quality, i.e. low relevance, with regards to user interest. Often termed "web spam", the purpose of artificially promoted pages is to "trick" search engines into directing traffic to the artificially promoted web pages so that users are encouraged to navigate to their low-quality web pages often for, but not limited to, commercial purposes. Artificially promoted web pages may include content ranging from adult content to commercial web pages of legitimate companies. Artificially promoted web pages will be referred to herein after as "undesirable web pages".

Currently, procedures for detecting undesirable web pages rely heavily on human editors. The editors are employed to analyze resources indexed by a search engine in order to identify representative examples of various categories of undesirable web pages (e.g., web spam, adult content, etc.) among the indexed resources. Detection algorithms are then generated based on the results of the analysis and implemented for subsequent detection of similar undesirable resources. This practice of identifying and demoting undesirable resources is extremely complex as well as cumbersome, costly, and sometimes unreliable. Search engines strive to improve the detection performance of these algorithms (i.e. reducing the occurrences of false positives and false negatives output by the algorithms).

DETAILED DESCRIPTION

Figure 1:
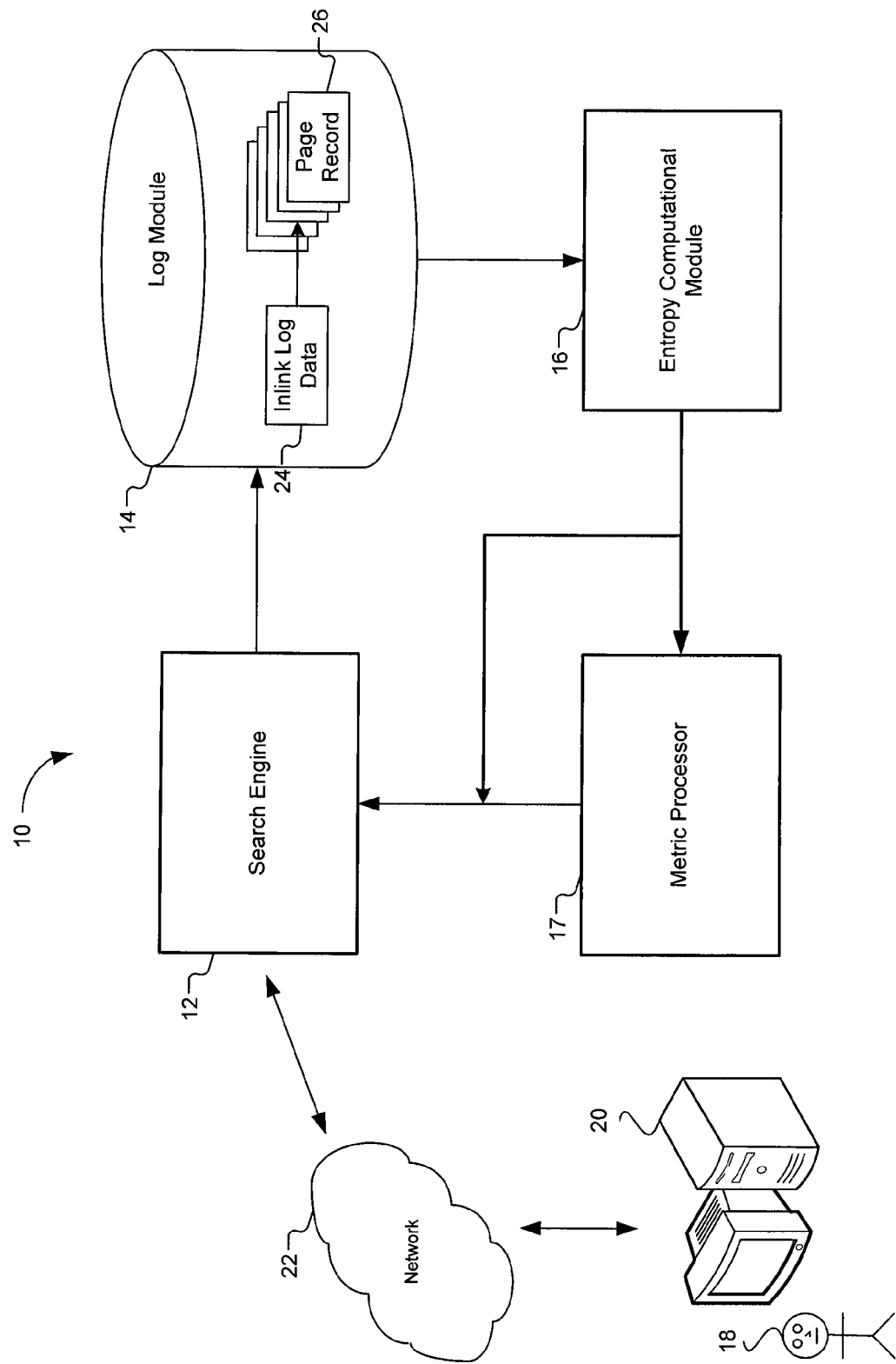
FIG. 1 is a functional block diagram illustrating an exemplary detection system implementing the present disclosure.

An enhanced system and method is disclosed for detecting the artificial promotion of undesirable web pages. The system and method may further subsequently "demote" the ranking of such web pages among desired search results returned by a query. In particular, the disclosed embodiments below provide a system for detecting the artificial promotion of a resource, the system including a search engine that indexes a set of incoming links ("inlinks") referencing the resource, a log module coupled with the search engine and configured to store log data associated with the set of inlinks, a partitioning module coupled with the log module and operative to partition the set of inlinks into a plurality of groups of inlinks based on at least one partitioning scheme, a statistics module coupled with the partitioning module and operative to calculate a statistic associated with the inlinks within each of the plurality of groups of inlinks, a computation module coupled with the statistics module and operative to to process the statistics associated with the inlinks of each of the plurality of groups of inlinks and compute a metric associated with set of inlinks where the metric indicates a level of uniformity of a distribution of values of the statistics among the plurality of groups of inlinks, and where the search engine places a list of search results, generated in response to a search query, in a pattern based on the metric value.

The following description is merely exemplary in nature and is in no way intended to limit the disclosure, its application, or uses. For purposes of clarity, the same reference numbers will be used in the drawings to identify similar elements. To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. Herein, the phrase "coupled with" is defined to mean directly connected to or indirectly connected through one or more intermediate components. Such intermediate components may include both hardware and software based components.

By way of introduction, the embodiments described herein are related to various systems and methods that assist in detecting the artificial promotion of destination web pages, or target web pages, and are merely exemplary in nature. More particularly, a system is configured to aid in determining the likelihood that a destination resource has been artificially promoted based on data derived from a compilation of logs storing information pertaining to inlinks associated with respective destination pages. In an alternative embodiment, the disclosed system may be further utilized to assist in demoting artificially promoted destination pages, thereby improving search results for a given search query.

As used herein, a search engine refers to a computer program that is configured to search the contents of sources, such as a database, to locate information related to a search query. A search query refers to a term, phrase, or group of terms, possibly combined with other syntax, symbols, and numbers, etc. that characterizes information that a user seeks to obtain from the search engine.

An incoming link, referred to herein as also as an "inlink," refers to a link (i.e. user selectable content on a web page, such as a hypertext link or uniform resource locator ("URL")) that links a source web page (i.e., the web page having the link) to a destination web page, i.e. the selection, by a user within their web browser program, of the link as presented on the source web page causes the browser program to load/present the resource or content identified by the link, e.g. the destination web page. As was discussed above, search engines, when indexing (i.e., extracting) web pages, process and account for links presented on those web pages as a factor in indexing and assessing relevancy of the resources, e.g. web pages, identified by those links, based on an assumption that one web page links to another because of some underlying rationale or relationship such as the pages providing similar or related content. Search engine optimizers (SEOs) often increase the number of inlinks pointing to a particular destination web page or website (i.e., a destination resource) in an effort to elevate the rank of the particular destination resource among other search results, or "hits", returned by a search engine in response to a search query submitted by a user. In other words, SEOs increase the number of inlinks pointing to a particular destination resource in order to increase the likelihood that the destination resource (i.e., the artificially promoted resource) is positioned, or displayed, as a hit near the top of the order of search results. By being positioned near the top of the order of search results, the probability that the destination resource may be selected by a user increases substantially. For example, an SEO may create a "link farm". A link farm is a group of web pages that are intended to increase the perceived authority of other web pages, e.g. the web pages of the SEO's subscribers, by utilizing artificial references within the link farm to these other web pages but are otherwise essentially devoid of genuine information of interest to web users. A link farm web page's sole purpose is to be indexed by a search engine thereby causing the search engine to index the inlinks contained therein to the SEO's subscriber's web pages.

FIG. 1 shows an exemplary system 10 that implements one embodiment of the disclosed detection system 10. The system 10 includes a search engine 12, a log module 14, an entropy computational module 16, a metric processor 17, a user 18, a user device 20, and a network 22. The user device 20 is coupled with search engine 12 via the network 22. The search engine 12 is coupled with the log module 14, the entropy computational module 16, and the metric processor 17. The log module 14 is coupled with the entropy computational module 16. The entropy computational module 16 is further coupled to the metric processor 17. It will be appreciated that one or more of the modules may be integrated together or further sub-divided into additional discrete components. It will also be appreciated that the embodiments disclosed herein may be implemented in one or more computer programs executing on one or more programmable systems comprising at least one module and at least on data storage system. Each such program may be implemented in any desired computer language to communicate with a computer system. Furthermore, variations in the arrangement and type of modules may be made without departing from the spirit or scope of the claims as set for herein. Additionally, different and/or fewer modules may be provided.

The network 22 enables the user device 20 to communicate with the search engine 12. The network 22 may include any communication method by which information may travel between the various components of the system 10. The network 22 may include one or more of a wireless network, a wired network, a local area network (LAN), a wide area network (WAN), a direct connection such as through a Universal Serial Bus (USB) port, and may include the set of interconnected networks that make up the Internet, intranet, or other communication network. The network 22 may be the network discussed below with respect to FIG. 4.

The user 18 utilizes the search engine 12 via the network 22. The user device 20 may be any device that the user utilizes to connect with the network 22. In one embodiment, the network 22 is the Internet and the user device 20 connects with a website provided by a web server, such as the search engine 12, that is in communication with the network 22. In alternate embodiments, there may be multiple user devices 20 representing the users that are connected with the network 22. The user 18 may not only include an individual, but a business entity or group of people. Any user 18 may utilize the user device 20, which may include a conventional personal computer, computing device, or a mobile user device, including a network-enabled mobile phone, VoIP phone, cellular phone, personal digital assistant (PDA), pager, network-enabled television, digital video recorder, an/or an automobile. The user device 20 configured to connect with the network 22, may be the general computer system or any of the components as described with respect to FIG. 4. In one embodiment, the user device 20 may be configured to communicate with the search engine 12 through the network 22 with a web browser, such as Internet Explorer. The web browser provides an interface through which the user 18 may receive search results in response to a search query submitted via the user device 20. In alternate embodiments, there may be additional user devices 20, and additionally intermediately networks (not shown) that are established to connect the users 18 or user devices 20.

In one embodiment, the log module 14 stores one or more web page logs. The log module 14 may include one or more databases and/or servers (not shown) that store inlink log data 24 derived from various web pages. The inlink log data is a text or other data type, such as binary. The inlink log data may be organized and stored as one or more web page records 26. A web page record 26 may be created and/or maintained by the search engine 12 and may represent a single destination resource (e.g., a web page or set of related web pages such as a website) indexed by the search engine 12 at a specified time, over a range of time, or over a non-consecutive series of time intervals. Each web page record 26 is populated with data such as, but not limited to, data representative of the various inlinks to the destination resource or data related to the content of the destination resource. In one embodiment, the data recorded by the log module 14 includes data associated with each resource indexed (i.e., extracted) by the search engine 12. The analysis of the inlink log data 24 stored by the log module 14 will be discussed in further detail below. For the sake of simplicity and brevity, the present disclosure will discuss the operation of the detection system with regards to the analysis of a destination web page though those skilled in the art will appreciate that the other combinations of resources, such as websites, may be analyzed.

The entropy computational module 16 communicates with the log module 14 and the search engine 12. The entropy computational module 16 may mine a plurality of inlinks associated with various destination pages received from the log module 14. Herein, mining may refer to analyzing or otherwise processing the inlink log data 24 for the purpose of computing various "information entropy" metrics that assist in detecting artificially promoted destination web pages. Information entropy metrics and their computation will be described in more detail below. In one embodiment, the entropy computational module 16 mines historical inlink data logged over a predetermined period of time (e.g., three months, six months, a year, etc.) to determine the probability or likelihood of artificial promotion of various destination web pages. The entropy computational module 16 generates the informational entropy metrics (metrics) associated with each destination web page "offline", as will be described in more detail below, and utilizes the informational entropy metrics when generating lists of search results based on subsequent search queries performed by various users 18 of the system 10. In some embodiments, the entropy computational module 16 may include one or more databases and/or servers (not shown) that store the metrics computed for the various inlinks associated with a given destination web page. In other embodiments the log module 14 may store the computed metrics.

The search engine 12 may be a content provider or a web server operated over the network 22 that provides pages to users 18, via the user device 20. User devices 20 may be represented by user-interactive devices that typically run browser applications, and the like, to display requested web pages (i.e., requested URLs) received over the network 22 as described above. The search engine 12 may comprise a general computing system or any of the components as described with respect to FIG. 4. In various embodiments, the search engine 12 is a webserver that provides a website that may be accessed by users 18 and includes the ability to conduct a search over the network 22, such as the Internet. The search system offered by Yahoo! Inc. is one example of a search engine embedded in a website (www.yahoo.com). The search engine 12 may receive a search query from the user 18 and provide search results to the user 18. The search engine 12 may also provide other content and/or advertisements in addition to the search results.

In one embodiment, the search engine 12 may comprise a registration database (not shown) utilized to store registration data provided by various users 18 enabling the user 18 to activate and log into a user account via the user device 20. The registration data may include information such as each respective user's login name, password, and/or address. The registration database may also include personal information about each respective user 18.

The search engine 12 may employ a combination of various ranking functions that place the list of search results generated by a search query submission in a pattern which is based, in part, on the determined relevancy of the search results. For example, the most relevant search results may be positioned, or displayed, near the top of the search results web page for quick accessibility by the user 18. In various embodiments, the search engine 12 utilizes the metrics generated by the entropy computational module 16 at "run time" (i.e., during execution) of a search query.

Figure 2:
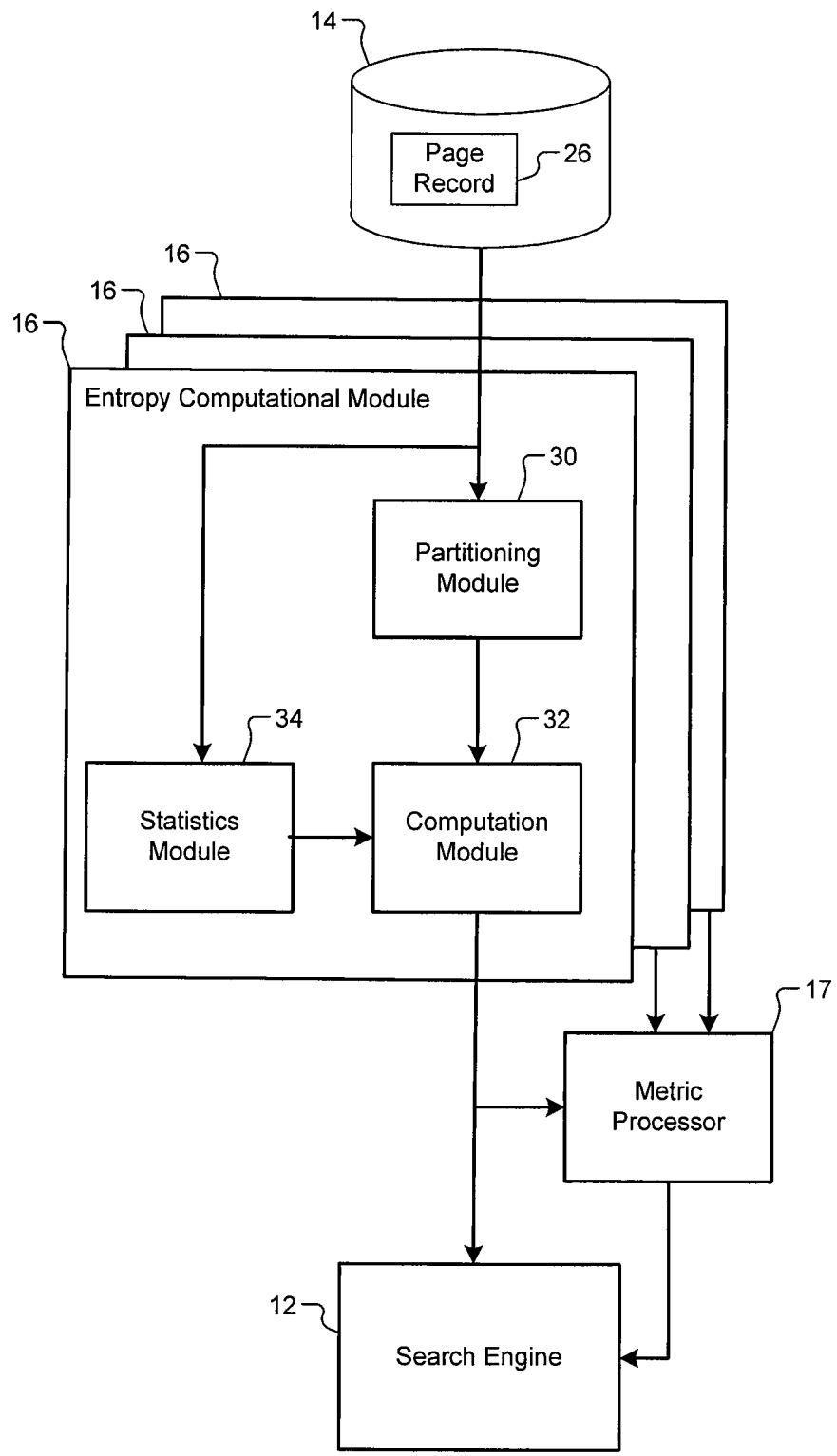
FIG. 2 is a functional block diagram of an exemplary entropy computational module according to the present disclosure.

Referring now to FIG. 2, the entropy computational module 16 that implements the detection system is shown in more detail. As noted above, the entropy computational module 16 is coupled with the log module 14 and the search engine 12. In one embodiment, the entropy computational module 16 may include a partitioning module 30, a computation module 32, and a statistics module 34. The partitioning module 30 is coupled with log module 14 and the computation module 32. The computation module 32 is further coupled with the search engine 12. The statistics module 34 is coupled with the log module 14 and the computation module 32. Other computational modules may be used instead of those illustrated in FIG. 2, and/or other combinations may be used to achieve particular design goals.

As mentioned above, the entropy computational module 16 generates the information entropy metrics based on various inlinks associated with each indexed destination web page. More specifically, the computation of the information entropy metrics is based on an analysis of the statistics characterizing a set of inlinks associated with a given destination, or target, web page.

Generally, an information entropy metric, also referred to as simply "entropy", indicates a measure of the uniformity of the statistical distribution of a discrete random variable. When the likelihood of each possible outcome of a random variable is equal, the information entropy metric equals its maximum value. On the other hand, if the random variable can equal only one possible value, the information entropy metric value equals "0".

In similar fashion, the information entropy metric computed by the entropy computational module 16 reflects a measure of uniformity associated with any observed statistic computed for a plurality of groups of inlinks for a given destination web page. The statistics of a group of inlinks may include, but are not limited to, a summation value, a maximum value, a minimum value, an average value, a geometric mean value, a median value, a standard deviation, and/or a variance among some numerical data characterizing the set of inlinks. The present disclosure will discuss the analysis of the number of inlinks grouped together based on a given partitioning scheme applied to a set of inlinks associated with a given destination page. Those skilled in the art will appreciate that other statistics of a set of inlinks may be computed.

For the sake of convenience, an entropy value may be normalized by dividing the entropy value by its maximum possible value. In this example, the value of "1" is the maximum allowed value for a normalized entropy. In the present example utilizing the number of inlinks within each of the plurality of groups, an entropy value of "1" indicates that a given set of inlinks are partitioned such that each group contains the same number of inlinks or "counts" (i.e., the set of inlinks are uniformly distributed among the plurality of groups) for a given partitioning scheme. The minimum possible value of an entropy value is "0". An entropy value of "0" indicates that a given set of inlinks are not uniformly distributed among the plurality of groups for a given partitioning scheme and primarily populate one single group. Typically, most statistics derived from Web data such as statistics associated with a set of inlinks pointing to a target web page generally do not either form a uniform distribution or concentrate on one single value when the set of inlinks are sorted into groups based on a given partitioning scheme. As the value of the normalized entropy metric associated with a set of inlinks referencing the destination page approaches an outer limit of an acceptable range (e.g., 0 or 1), the likelihood that the set of inlinks to the destination web page is "unnatural" increases. In other words, there exists an inference that some of the inlinks among the set have been created for the purpose of artificial promotion of the destination web page rather than based on the genuine interests from a diverse set of independent users.

The partitioning module 30 receives inlink log data 24 (e.g. a page record 26) from the log module 14 and partitions a set of inlinks associated with a destination web page into separate and distinct groups of inlinks (i.e., the partitioning module 30 applies a partitioning scheme to the set of inlinks). The set of inlinks may be partitioned into groups based on the respective internet protocol (IP) address associated with each inlink, the respective top-level domain name associated with each inlink, the written language used to create each inlink (e.g., English, French, or German), an autonomous system (i.e., a networked system of computing devices) associated with each inlink, and/or the respective anchor text (i.e., the clickable text) contained within each inlink, or combinations thereof. The partitioning module 30 then determines the number of "counts", i.e. the number of inlinks, contained within each group of inlinks.

In one embodiment, the partitioning module 30 may employ an IP address partitioning scheme. An IP address represents a numerical identification assigned to devices (e.g., user device 20) within a network (e.g. network 22) that uses the Internet Protocol for communication between nodes of the network. Specifically, the Internet Protocol is utilized to direct, or route, data between various nodes based on the respective IP addresses of a source node and destination node of the data. The present disclosure contemplates utilizing an IP address partitioning scheme with various iterations of the Internet Protocol such as Internet Protocol Version 4 (IPv4) and Internet Protocol Version 6 (IPv6).

Take for example the IPv4 in which respective IP addresses include 32 bits and are stored as binary numbers but are often expressed in "dot-decimal notation". Dot-decimal notation represents a method of expressing binary numbers of an IP address in "octet" grouped base-10 (i.e., decimal) numbers that are each separated from one another by a decimal, or full stop. For example, an IP address may include the dot-decimal number 206.190.60.37. The four numbers (e.g., 206, 190, 60 and 37) separated by the decimals are each referred to as "octets". Each respective octet may possess a value within the range of 0 to 255 (i.e., $2^8$ possible values are available for each octet).

Each 32-bit IP address contains a "network field" that includes the leading bits of the first octet and a "rest field". The network field defines various "classes" of networks and the rest field identifies a host with the defined network. In one embodiment, five distinct classes are defined, three of which (e.g., Class A, Class B, and Class C) are respectively characterized by a different length of the network field. In other words, Classes A, B, and C each possess a different number of available hosts. The remaining two classes include Class D for multicast addressing and Class E reserved for experimental purposes.

An exemplary IP address partitioning scheme may include a set of inlinks that each navigate to www.yahoo.com but reside in respective networks having different class designations. In the present example, the entropy computational module 30 may partition the set of inlinks pointing to www.yahoo.com into three groups corresponding to Class A, Class B, and Class C respectively. The computation module 32 then utilizes the distinct number of "counts", i.e. number of inlinks associated with each respective network class, within each group to generate the informational entropy metric value for the IP address partitioning scheme.

In another embodiment, the partitioning module 30 may employ a top-level domain name partitioning scheme. Those skilled in the art will appreciate that the partitioning module 30 may also employ a domain name partitioning scheme. Domain names are typically used for identification, reference, and access to Internet resources. Domain names enable, for example, the user 18 to more easily locate and communicate with web sites by providing the use of recognizable alphabetical addresses (e.g., www.yahoo.com) as a representation of mostly numerically addressed Internet resources. A domain name is then resolved or translated to a corresponding IP address by a mapping function provided by a domain name server.

Domain names typically include a hierarchy of two or more elements known as "labels". Labels included within a domain name are typically separated by a period ("."). Each domain name ends in a top-level domain name. The label furthest to the right of a domain name (i.e., the first-level domain with domain name hierarchy) represents the top-level domain name. For example, the domain name "yahoo.com" of the host "www.yahoo.com" includes the top-level domain ".com". Top-level domains may include a two-character territory code known country code top-level domains (ccTLDs). Typically ccTLDs are reserved for countries or dependent territories. For example, the ccTLDs ".au", ".de", and ".fr" represent the countries Australia, Germany, and France, respectively.

An exemplary top-level domain partitioning scheme may include, for example, a set of inlinks that each point to the web page http://www.yahoo.com/with the source pages hosting the respective inlinks associated with various top-level domains such as ".com", ".org", ".gov" and ".edu" within their addresses. In the present example, the partitioning module 30 may partition the set of inlinks pointing to www.yahoo.com into four groups corresponding to the top-level domains ".com", ".org", ".gov", and ".edu", respectively. The computation module 32 then utilizes the "counts", i.e. the number of inlinks associated with the corresponding top-level domain, within each group to generate the informational entropy metric value for the top-level domain partitioning scheme.

In yet another embodiment, the partitioning module 30 may employ an anchor text partitioning scheme. As mentioned above, each inlink is associated with a clickable text known as anchor text. The anchor text itself generally provides a user 18 with descriptive information regarding the contents of the destination web page. An exemplary anchor text partitioning scheme may include a set of inlinks that reference www.yahoo.com and may respectively include anchor texts with varying verbiage such as "Yahoo", "Yahoo!", "Yahoo.inc", etc. In the present example, the partitioning module 30 may partition the set of inlinks pointing to www.yahoo.com into three groups corresponding to the anchor texts "Yahoo", "Yahoo!", and "Yahoo.inc", respectively. The computation module 32 then utilizes the "counts", i.e. number of inlinks associated with the corresponding anchor text, within each group to generate the informational entropy metric value for the anchor text partitioning scheme. In an exemplary embodiment, the anchor texts are canonicalized based on specific rules or specifications. For example, the anchor texts may be processed based on cases, spacing between words, and/or other normalization methods. In another embodiment, the anchor text may be an enhanced data structure that contains the detected language used or the detected region of the source.

Those skilled in the art will appreciate that various other partitioning schemes are contemplated by the present disclosure. For example, in other embodiments, two partitioning schemes can be combined with m and n partitions, respectively, to form a scheme that comprises mn partitions simply by sub-partitioning one with the other. Such a combination partitioning scheme may be further modified by merging groups of inlinks that are determined to be in the "tail ends" of the overall distribution of the set of inlinks (i.e., the fringe groups containing relatively few inlinks may be merged together). In some embodiments, fringe groups that do not contain inlinks may be discarded before use by the computation module 32.

Furthermore, the information entropy metrics associated with various destination web sites may be computed based on a single partitioning scheme or several partitioning schemes used in combination with one or more statistics computed for each group of inlinks. For the sake of simplicity and brevity, the present disclosure will discuss the operation of the detection system based on the utilization of a single partitioning scheme and a single computed statistic, though those skilled in the art will appreciate that the other combinations of partitioning schemes and computed statistics may be implemented.

It should be noted, that the number of inlinks contained within each group relative to each other often exhibit "natural" distribution patterns such that there exist substantially fewer groups of inlinks that respectively include a higher number of inlinks than the number of groups that respectively include a lower number of inlinks. In other words, the distribution of the number of inlinks contained within each group relative to each other is not uniform. One common example of a natural distribution is known as a power law relationship. Typically, a power law is a specific statistical distribution that exhibits a relatively strict property of scale invariance. As such, an entropy value that approaches either extreme within an allowable range implies a deviation, or departure, from a natural distribution of the set of inlinks. In other words, a normalized entropy value computed based on a set of inlinks that approaches the values of either 0 or 1 reflects an increased likelihood of artificial promotion of the destination web page pointed to by the set of inlinks.

In one embodiment, the computation module 32 computes the information entropy metric value for a set of S inlinks partioned based on an anchor text partitioning scheme. The number of S inlinks are computed as follows $$S = \sum_{i=1}^{n} x_i$$

where $x_i$ represents the number of inlinks associated with a specific anchor text (i.e., the set of inlinks are partitioned into n groups of inlinks where each group represents a distinct, observed anchor text pointing to a destination page). The entropy of these counts, Entropy(p) is computed as follows $$\text{Entropy}(p) = -\sum_{i=1}^{n} p_i \log p_i$$

where $p_i = x_i/S$ for each $i=1, 2, \ldots, n$, with $p_i$ representing a normalized value of the counts within a specific group i of inlinks generated by a given partitioning scheme and n represents the number of groups formed via the partitioning scheme. In another embodiment, the $x_i$ may represent some other statistic to be determined by the statistics module 34, with their sum S computed giving rise to the normalized values $p_i = x_i/S$ for each $i=1, 2, \ldots, n$. The entropy may be normalized based on the maximum possible value log(n), such that Normalized Entropy(p)=Entropy(p)/log(n).

In some embodiments, a mathematical identity may be employed for computing the entropy, or information entropy metric, as follows:

$$\text{Entropy}(p) = \log S - \frac{1}{S} \sum_{i=1}^{n} x_i \log x_i$$

In some embodiments, the calculated entropy values for a set of inlinks associated with a given destination web page may be subject to further processing by the search engine 12. The search engine 12 may utilize the entropy values as input to the ranking functions used to prioritize a list of search results based in part on the determined relevancy of the search results. In one embodiment, the search engine 12 may demote a ranking of a destination web page among a list of search results if an entropy value of a set of inlinks pointing to the destination web page approaches the extremes of its allowable range. Some embodiments may compare a computed entropy value with predetermined threshold values by the metric processor 17. Each respective threshold may be based on the application utilized in combination with the disclosed detection system.

In some applications, the thresholds may be adaptively set based on "on-the-fly" data (e.g. concurrently retrieved search results) and/or in conjunction with other algorithms used for detecting adversarial web pages and/or ranking search results. In various embodiments, the metric processor 17 may allow a range of values (with the endpoints of an interval as high and low thresholds) for each combination of weighting and partitioning schemes, and these thresholds may be varied based in part on historical log data (e.g., the data stored within the log module 14 related to a given resource) such that a respective entropy value above or below the allowed range (i.e., cut off by the thresholds) may indicate that the corresponding destination page has an increased likelihood of being artificially promoted. Additionally, each threshold may be normalized.

In the present implementation, the statistics module 34 may perform statistical operations on the numerical information of a set of inlinks, thereby generating statistics for use in the computation of information entropy values. As mentioned above, the computed statistics of a set of inlinks may include, but are not limited to, a summation value, a maximum value, a minimum value, an average value, a geometric mean value, a median value, a standard deviation, and/or a variance of the numerical data among each group of inlinks. Additionally, statistics for a given set of inlinks may be computed based on other statistical operations natural to the respective applications in which the disclosed detection system is implemented. In one embodiment, the computation module 32 may generate an information entropy value associated with each combination of partitioning scheme(s) and computed statistic(s) for a set of inlinks associated with a given destination web page.

The statistics module 34 may apply PageRank, link age-attenuated weighting, and/or other weighting factors that generally follow a distribution pattern lacking uniformity such as power law distribution pattern to a set of inlinks. PageRank constitutes a set of algorithms for assigning numerical weights to web pages indexed by the search engine 12 as a measure the web pages' respective popularity based on a link structure of a network of all web pages crawled by the search engine 12. Link age-attenuated weighting is a weighting scheme used to reflect the importance associated with various inlinks over time. A weighting value assigned to each inlink or group of inlinks may decrease exponentially over a period of time, thereby discounting inlinks indexed earlier in time while not discarding these inlinks entirely and giving more importance to recently indexed inlinks. Those skilled in the art will appreciate that other weighting schemes are contemplated by the present disclosure.

Furthermore, the statistics module 34 may utilize several levels of granularity when weighting a set of inlinks. For example, the statistics module 34 may weight each respective inlink independently or collectively weight an entire group of inlinks generated by a given partitioning scheme.

An entropy metric may be used directly as an input to a ranking function of the search engine 12 for prioritizing search results. In other embodiments, an entropy metric may be further processed by the metric processor 17. For example, the metric processor 17 may perform the thresholding operations discussed above for detection, other algorithmic operations, and/or mathematical transformations.

In some embodiments, a plurality of entropy computational modules 16, as depicted in FIG. 2, may be combined where each entropy computational module 16 utilizes a distinct combination of a partitioning scheme and a statistic computed for each group of inlinks in order to enhance the determination of whether a given set of inlinks fails to adhere to natural distribution patterns. Although three entropy computational modules 16 are depicted, those skilled in the art will appreciate that fewer or more entropy computational modules 16 are contemplated. In some embodiments, the metric processor 17 may manage the combination of the plurality of entropy computational modules 16 and the thresholds employed in each of the entropy computational modules 16. In some embodiments, the output of the entropy computational module(s) 16 may be combined with other metrics computed for detecting other undesirable web pages that include spam, adult content, and/or low-quality content for the purpose of re-ranking the results of the search engine 12.

The disclosed detection system may be applied to various other network applications such as an online social network on the internet or other networks in a wireless mesh network. In some embodiments, a target resource may be a user profile in which each respective inlink, or simply "link", may be either a unilateral contact or a bilateral connection established by one or more user accounts. A partitioning scheme used to partition the set of links connecting to the user profile may be based on, but not limited to, geographic locations, social and demographic attributes, and/or an association with various groups or "clubs" within the network.

Figure 3:
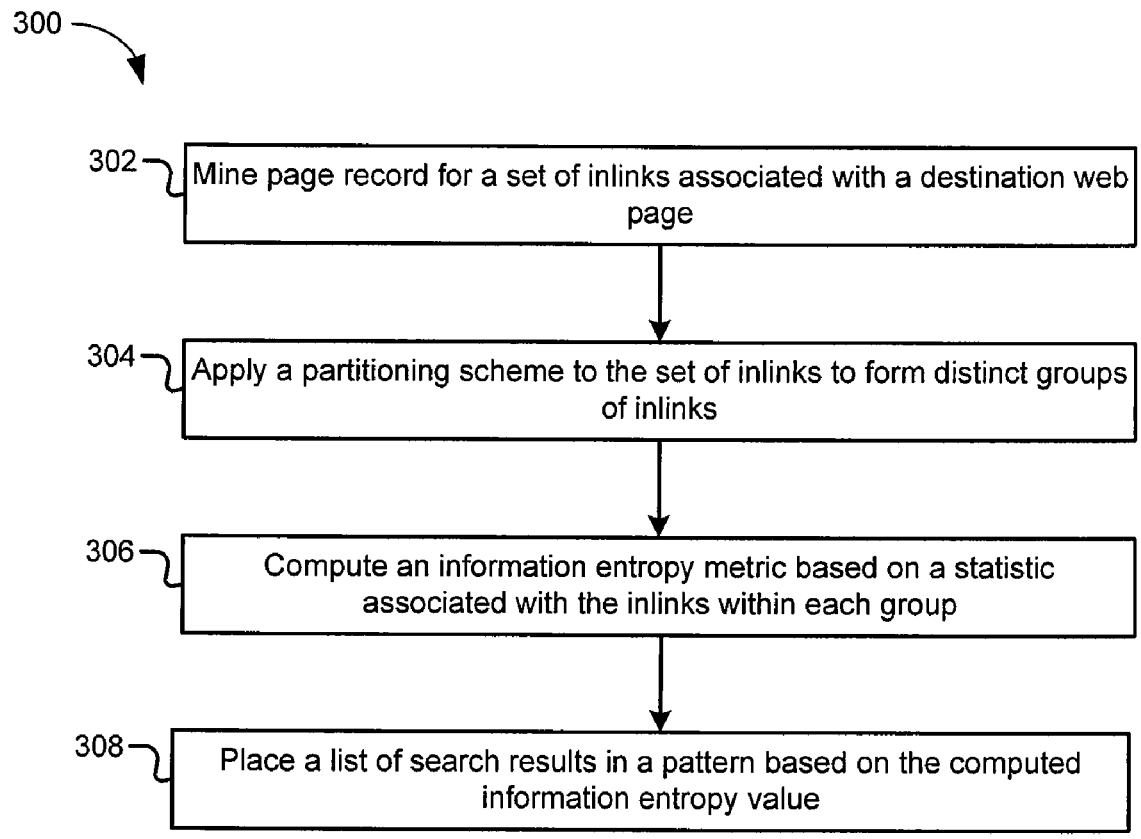
FIG. 3 is a flow diagram illustrating steps of operating an exemplary detection method according to one embodiment of the present disclosure.

Referring to FIG. 3, an exemplary method 300 of performing a detection operation for a given destination web page is shown in more detail. In block 302, the partitioning module 30 mines a page record 26 from inlink log data 24 stored in the log module 14 and extracts a set of inlinks associated with a given destination web site. In block 304, the partitioning module 30 applies a partitioning scheme to the set of inlinks to form groups of inlinks. In block 306, the computation module 32 generates an information entropy metric for the set of inlinks associated with the given destination web page based on a statistic associated with the inlinks within each group. In various embodiments, the statistics module 34 may compute a statistic for each set of inlinks independently or collectively among the plurality of groups on inlinks. Additionally, the statistics module 34 may selectively apply a weighting scheme to each respective inlink independently or collectively weight an entire group of inlinks generated by a given partitioning scheme.

In block 308, the search engine 12 places a list of search results, generated in response to a search query, in a pattern based, in part, on the metric value. In some embodiments, the search engine 12 may demote the ranking of the destination web page among the list of search results based on the computed information entropy metric value.

Figure 4:
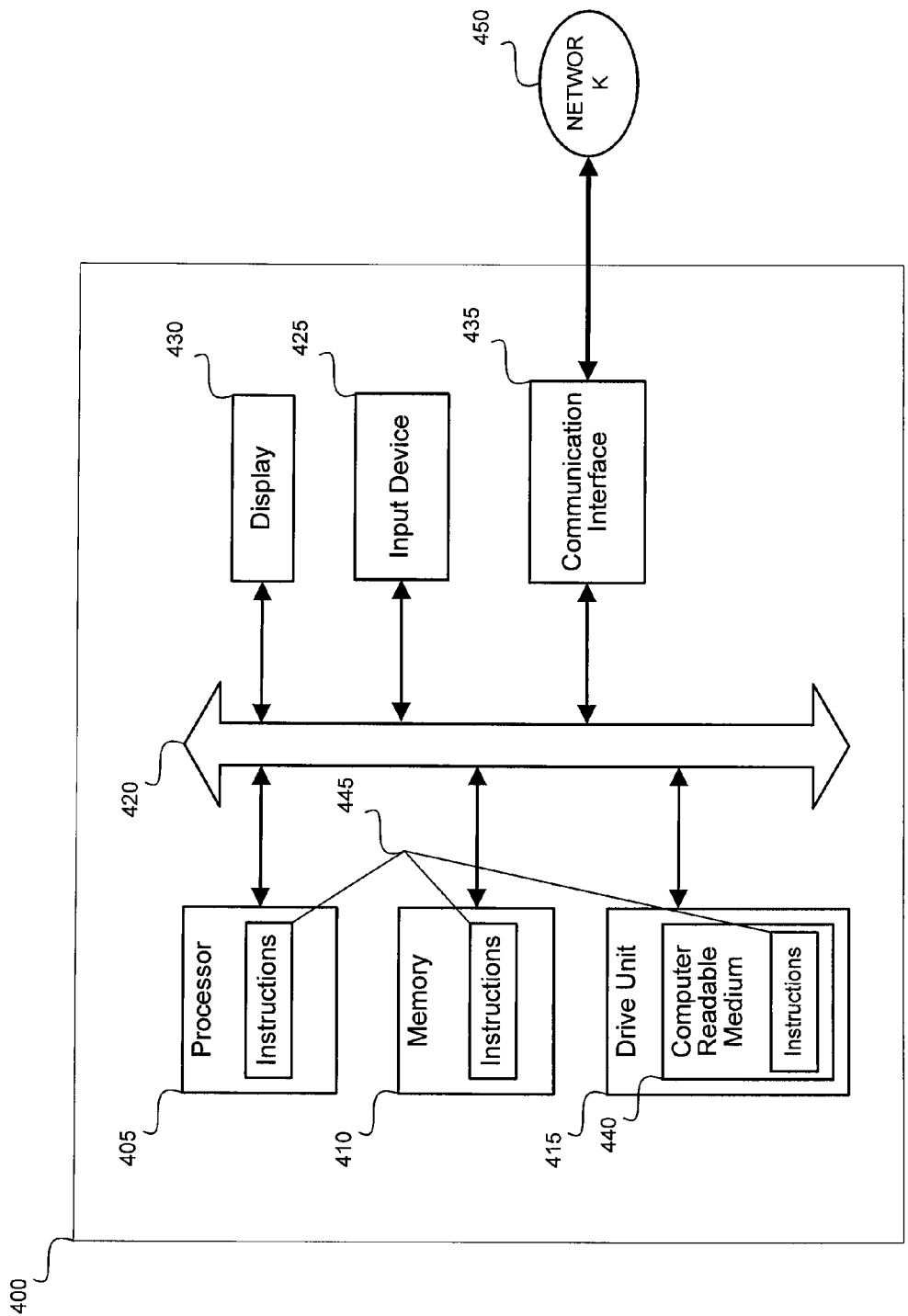
FIG. 4 illustrates a general computer system, which may represent any of the computing devices referenced within the present disclosure.

Referring to FIG. 4, an illustrative embodiment of a general computer system is shown and is designated 400. Any of the components shown in the computing system 400 may describe the components discussed with respect to FIGS. 1 and 2. The computer system 400 may include a set of instructions 445 that may be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 445 (sequential or otherwise) that specify actions to be taken by that machine. In one embodiment, the computer system 400 may be implemented using electronic devices that provide voice, video or data communication. Further, while a single computer system 400 may be illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 405, such as, a central processing unit (CPU), a graphics processing unit (GPU), or both. The processor 405 may be a component in a variety of systems. For example, the processor 405 may be part of a standard personal computer or a workstation. The processor 405 may be one or more general processors, digital signal processors, application specific integrated circuits, field programmable gate arrays, servers, networks, digital circuits, analog circuits, combinations thereof, or other now known or later developed devices for analyzing and processing data. The processor 405 may implement a software program, such as code generated manually (i.e., programmed).

The computer system 400 may include a memory 410 that can communicate via a bus 420. For example, the registration database 110 may be stored in the memory. The memory 410 may be a main memory, a static memory, or a dynamic memory. The memory 410 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 410 may include a cache or random access memory for the processor 405. Alternatively or in addition, the memory 410 may be separate from the processor 405, such as a cache memory of a processor, the system memory, or other memory. The memory 410 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 410 may be operable to store instructions 445 executable by the processor 405. The functions, acts or tasks illustrated in the figures or described herein may be performed by the programmed processor 405 executing the instructions 445 stored in the memory 410. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 400 may further include a display 430, such as a liquid crystal display (LCD), an organic light emitting diode (OLED), a flat panel display, a solid state display, a cathode ray tube (CRT), a projector, a printer or other now known or later developed display device for outputting determined information. The display 430 may act as an interface for the user to see the functioning of the processor 405, or specifically as an interface with the software stored in the memory 410 or in the drive unit 415. In this regard, the display 430 may be utilized to display, for example, whether a business organization is a candidate for transformation. The display 430 may also be utilized to display a transformation plan. In addition, the various reports and surveys described above may be presented on the display 430.

Additionally, the computer system 400 may include an input device 430 configured to allow a user to interact with any of the components of system 400. The input device 425 may be a number pad, a keyboard, or a cursor control device, such as a mouse, or a joystick, touch screen display, remote control or any other device operative to interact with the system 400.

The computer system 400 may also include a disk or optical drive unit 415. The disk drive unit 415 may include a computer-readable medium 440 in which one or more sets of instructions 445, e.g. software, can be embedded. Further, the instructions 445 may perform one or more of the methods or logic as described herein. The instructions 445 may reside completely, or at least partially, within the memory 410 and/or within the processor 405 during execution by the computer system 400. The memory 510 and the processor 405 also may include computer-readable media as discussed above.

The present disclosure contemplates a computer-readable medium 440 that includes instructions 445 or receives and executes instructions 445 responsive to a propagated signal; so that a device connected to a network 450 may communicate voice, video, audio, images or any other data over the network 450. The instructions 445 may be implemented with hardware, software and/or firmware, or any combination thereof. Further, the instructions 445 may be transmitted or received over the network 450 via a communication interface 435. The communication interface 435 may be a part of the processor 405 or may be a separate component. The communication interface 435 may be created in software or may be a physical connection in hardware. The communication interface 435 may be configured to connect with a network 450, external media, the display 430, or any other components in system 400, or combinations thereof. The connection with the network 450 may be a physical connection, such as a wired Ethernet connection or may be established wirelessly as discussed below. Likewise, the additional connections with other components of the system 400 may be physical connections or may be established wirelessly.

The network 450 may include wired networks, wireless networks, or combinations thereof. Information related to business organizations may be provided via the network 450. The wireless network may be a cellular telephone network, an 802.11, 802.15, 802.20, or WiMax network. Further, the network 450 may be a public network, such as the Internet, a private network, such as an intranet, or combinations thereof, and may utilize a variety of networking protocols now available or later developed including, but not limited to TCP/IP based networking protocols.

The computer-readable medium 440 may be a single medium, or the computer-readable medium 440 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 440 may include a solid-state memory such as a memory card or other package that houses one or more non-volatile read-only memories. The computer-readable medium 440 also may be a random access memory or other volatile re-writable memory. Additionally, the computer-readable medium 440 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which included all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

What is claimed is:

1. A system for detecting artificial promotion of a resource, comprising:
    computer readable program code operative in conjunction with a processor, the computer readable program code including code forming
        a search engine operative to index a set of incoming links ("inlinks") which reference the resource;
        a log module coupled with the search engine and configured to store log data associated with the set of inlinks;
        a partitioning module coupled with log module and operative to partition the set of inlinks into a plurality of groups of inlinks based on at least one partitioning scheme;
        a statistics module coupled with the partitioning module and operative to compute a statistic associated with the inlinks within each of the plurality of groups of inlinks;
        a computation module coupled with the statistics module and operative to process the computed statistic associated with the inlinks of each of the plurality of groups of inlinks and compute a metric associated with the set of inlinks, wherein the metric indicates a level of uniformity of a distribution of values of the respective computed statistics among the plurality of groups of inlinks, and
    wherein the search engine places a list of search results, generated in response to a search query, in a pattern based on the metric.

2. The system of claim 1 wherein the log data further comprises inlink log data for analysis by the computational module, wherein the inlink log data is associated with the resource.

3. The system of claim 1 wherein the at least one partitioning scheme comprises partitioning the set of inlinks based on the domain name of the source of each inlink of the set of inlinks, an internet protocol (IP) address segment of the source of each inlink of the set of inlinks, a language used to create each inlink of the set of inlinks, a geographic region associated with the source of each inlink of the set of inlinks, a network routing group associated with the source of each inlink of the set of inlinks, an anchor text associated with each inlink of the set of inlinks, or combinations thereof.

4. The system of claim 1 wherein the statistics module is further operative to weight the set of inlinks based on at least one weighting scheme.

5. The system of claim 1 wherein the metric value is associated with the at least one partitioning scheme and the at least one computed statistic.

6. The system of claim 5 wherein the at least one computed statistic assigns a value to each of the groups of inlinks based on at least one statistical operation performed on each of the groups of inlinks.

7. The system of claim 1 wherein the statistics module computes the computed statistic for each group of inlinks independently or collectively among the plurality of groups of inlinks.

8. The system of claim 1 wherein the search engine is configured to receive the metric value as an input to a ranking function operative to prioritize the list of search results.

9. The system of claim 1 wherein the search engine demotes a ranking of the resource among the list of search results based on the metric value.

10. The system of claim 1 further comprising a metric processor in data communication with the code forming the computation module and the code forming the search engine, the metric processor processes the metric value and generates an output transmitted to the search engine.

11. The system of claim 10 wherein the processing performed by the metric processor includes at least one of combining the metric value with other computed algorithmic metrics, using the metric value as input to another algorithm, transforming the metric value via a mathematical function, and comparing the metric value to a threshold.

12. A method for detecting the artificial promotion of a resource, comprising:
    at a processor of a computer system, indexing a set of incoming links ("inlinks") navigating to the resource;
    at a memory, storing log data associated with the set of inlinks;

at the processor, partitioning the set of inlinks into a plurality of groups of inlinks based on at least one partitioning scheme;

at the processor, computing at least one statistic associated with the inlinks within each of the plurality of groups of inlinks;

at the processor, processing the at least one computed statistic associated with the inlinks of each of the plurality of groups of inlinks and computing a metric associated with the set of inlinks, wherein the metric indicates a level of uniformity of a distribution of values of the respective computed statistics among the plurality of groups of inlinks, and at the processor, placing a list of search results, generated in response to a search query, in a pattern based on the metric value.

13. The method of claim 12 wherein the log data includes inlink log data associated with the resource.

14. The method of claim 12 wherein the at least one partitioning scheme comprises partitioning the set of inlinks based on the domain name of a source of each inlink of the set of inlinks, an internet protocol (IP) address segment of the source of each inlink of the set of inlinks, a language used to create each inlink of the set of inlinks, a geographic region associated with the source of each inlink of the set of inlinks, a network routing group associated with the source of each inlink of the set of inlinks, an anchor text associated with each inlink of the set of inlinks, or combinations thereof.

15. The method of claim 12 further comprising, at the processor, weighting the set of inlinks based on at least one weighting scheme.

16. The method of claim 1 wherein the metric value is associated with the at least one partitioning scheme and the at least one computed statistic.

17. The method of claim 16 wherein computing the at least one computed statistic comprises assigning a value to each of groups of inlinks based on at least one statistical operation performed on each of the groups of inlinks.

18. The method of claim 16 further comprising, at the processor, computing the at least one statistic for each group of inlinks independently or collectively among the plurality of groups of inlinks.

19. The method of claim 12 further comprising, at the processor, receiving the metric value as an input to a ranking function operative to prioritize the list of search results.

20. The method of claim 12 further comprising, at the processor, demoting a ranking of the resource among the list of search results based on the metric value.

21. The method of claim 12 further comprising, at the processor, further processing the metric value by a metric processor and generating an output transmitted to a search engine.

22. The method of claim 21 wherein the processing performed by the metric processor includes at least one of combining the metric value with other computed algorithmic metrics, using the metric value as input to another detection algorithm, transforming the metric via a mathematical function, and comparing the metric value to a threshold.

* * * * *